March 23, 1937. F. VON OKOLICSANYI Re. 20,311

PICTURE ASSEMBLING APPARATUS FOR TELEVISION RECEIVERS

Original Filed July 7, 1932

F. Von Okolicsanyi
INVENTOR

Marks & Clerk
ATTYS.

Reissued Mar. 23, 1937

Re. 20,311

UNITED STATES PATENT OFFICE 20,311

PICTURE ASSEMBLING APPARATUS FOR TELEVISION RECEIVERS

Franz von Okolicsanyi, Nuremberg, Germany

Original No. 1,923,520, dated August 22, 1933, Serial No. 621,290, July 7, 1932, and in Germany June 27, 1931. Application for reissue August 10, 1935, Serial No. 35,676

5 Claims. (Cl. 178—6)

Figure 1:
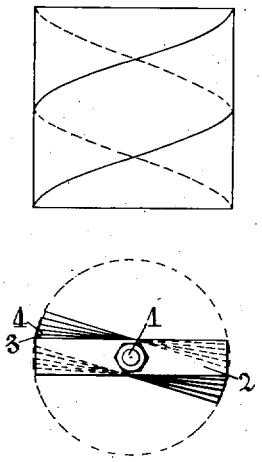

Picture assembling apparatus are known in which the assembling of the picture is effected by means of a number of mirror surfaces arranged along a rotary axis and displaced through an angle relatively to one another, and used in conjunction with a linear source of light which is parallel to the axis of rotation, a mirror surface being associated with each picture line. In order that the assembling of the picture should be uniform and without gaps, the mirrors are uniformly distributed through a total angle of 360°, so that one revolution of the mirror screw formed by the said mirror surfaces causes a complete picture to be assembled, the next picture following without any gap. If it is desired to produce a very detailed picture by using a very large number of lines, it is necessary to use a large number of mirror surfaces corresponding to the large number of lines, so that the angle between the two mirrors becomes very small. The great sharpness of the picture which is thereby obtained has, however, a series of great disadvantages.

If the picture is not to be distorted, the observation distance and the distance between the mirror screw and the source of light must not be too small. It has been found that the observation distance B is dependent upon the distance L of the lamp, as well as upon the width $b$ of the lines or mirrors, and the number Z of the lines. If the observation distance and the distance of the lamp are great relatively to the width and height of the picture, then a law similar to the lens law—

$$\frac{1}{B}+\frac{1}{L}=\frac{1}{F}$$

holds goods. This is due to the fact that in the case of subjective observation of a linear source of light arranged parallel to the axis of rotation, a surface of light is seen in the mirror screw. The screw thus acts optically as a cylindrical mirror. The focus F has a value which depends upon the width of the mirror and the number of mirrors, viz.—

$$\frac{b.Z}{4\pi}$$

which can be tested as follows:—When the mirror screw makes one revolution ($2\pi$), Z lines are seen. One line is thus completely seen during a rotation of the mirror through an angle of—

$$\alpha \text{ degrees}=\frac{2\pi}{Z}.$$

If L and B are equal, then the incident and reflected rays coincide with one another and the angle which is enclosed by the outermost rays, that is to say, the rays to the beginning and end of the lines is also equal to the angle, and as can be seen directly from the rectangular triangles which are produced, equal to—

$$\frac{b}{L}$$

if, as is allowable in the case of small angles, the angle is substituted for the sinus of the angle, we get then—

$$\frac{b}{L}=\frac{2\pi}{Z}$$

and $$\frac{2}{L}=\frac{4\pi}{b.Z}$$

If this result is compared with the equation—

$$\frac{1}{B}+\frac{1}{L}=\frac{4\pi}{b.Z}$$

it is found that the two are identical, since, in view of the assumption, L can be substituted for B.

The following results can be derived from the equation of the mirror screw. As the number of lines Z increases, $$\frac{1}{F}$$

becomes smaller, that is to say, F becomes greater, which means that the observation distance as well as the distance of the lamp must be increased. As can be seen from the formula, an unfavourably great observation distance may be reduced by a corresponding increase in the lamp distance which has, however, other disadvantages. The light losses increase so that the brightness of the picture is reduced. In order that light from the strip-like source of light should reach the eye of the observer over the uppermost and lowermost mirror, the source of light must, in accordance with the increased distance between the mirror and source of light, be made longer. It further follows from the formula, as in the case of lenses, that the optical adjustment is always more sensitive with respect to the shorter distance. In the case of small variations in the distance, the observer will thus see the picture distorted. Therefore, in practice, the distance of the lamp must be equal or smaller than the observation distance.

The present invention enables the distance of the lamp and the observation distance to be reduced to a very large extent by the mirrors being subdivided, not with respect to an angle $2\pi$, but with respect to an angle $n.2\pi$, wherein $n$ is an integer.

Figure 2:
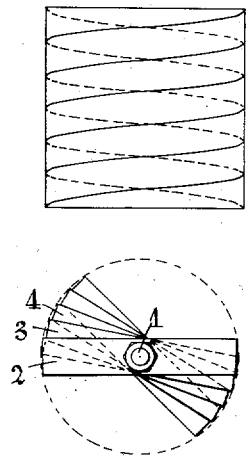
Figure 3:
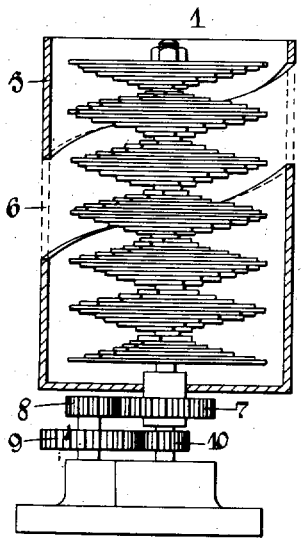
Figure 4:
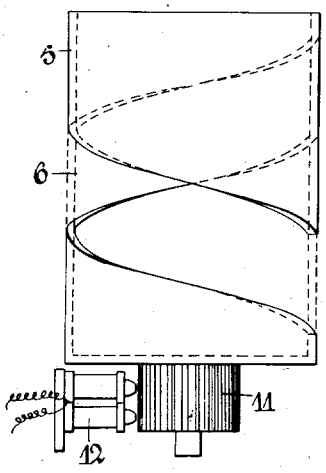

In the accompanying drawing Figures 1 and 2 illustrate diagrammatically the old and the new arrangement respectively. Figure 3 is a side elevation partly in section of an arrangement including a covering cylinder and drive means. Figure 4 is a similar view of a modification.

As will be seen from the plan view, the mirror surfaces 2, 3, 4 are displaced relatively to one another through an equal angle. Let us assume that the mirror screw comprises 90 mirrors. In the old arrangement, the angle between two consecutive mirrors is—

$$\frac{360^\circ}{90}=4^\circ.$$

In this case the mirrors have a screwthread with steeply inclined pitch (Figure 1).

In the arrangement according to the present invention the mirrors form two, three or more screwthreads, assuming the dimensions of the mirrors to be the same; for instance, in Figure 2, three screwthreads have been shown, by way of example. The angle through which the series of mirrors are displaced relatively to one another is equal to—

$$\frac{3.360^\circ}{90}=12^\circ.$$

In the case of 90 lines, a mirror width of 90 millimetres and height of 1 millimetre, the smallest observation and lamp distances, if the two are made equal to each other, are found to be over 1.3 metres. Naturally if a picture of 9×9 centimetres cannot be observed nearer, this means a great limitation. In the example above given according to the invention, this distance is reduced, in the case of three screw-threads, to—

$$\frac{1}{3}.$$

The mirror screw for the picture of 90 lines thus appears to be composed of three simple mirror screws for 30 lines, with a correspondingly decreased height. In any case the smallest observation distance corresponds to a mirror screw of 30 lines.

If it is desired to maintain the same picture frequency per second, it is necessary, as can easily be seen, to cause the mirror screw to rotate at a speed which is three times greater. As each three mirrors now have the same angular position along the whole of the screw mirror, it is necessary always to cover two mirrors, in order to prevent the simultaneous appearance of three picture elements. This is attained according to another feature of the invention by means of a cylinder provided with a helical slot and surrounding the mirror screw. One form of construction embodying this feature is illustrated in Figures 3 and 4. A triplicate screw is mounted on the spindle 1, and is surrounded by a cylinder 5 which is provided with a single-thread helical slot 6, the width of which is equal to the pitch of the mirror screw. The cylinder rotates at a speed corresponding to the picture frequency, that is to say, at a speed three times smaller than that of the mirror screw. In this way two-thirds of the mirror screw is always covered and each part thereof is left free once during each three revolutions of the mirror screw. In the construction illustrated in Figure 3, the two rotary parts have a common drive and the coupling between them is effected through the intermediary of toothed wheels 7, 8, 9, 10 geared together with a suitable gear ratio. It is to be understood that instead of the toothed wheels, use may be made of friction wheels.

According to another form of construction, the two rotary parts are driven separately by means of synchronous motors. By using suitable numbers of pairs of poles corresponding to the numbers of revolutions, (as is well known, the product of pairs of poles and number of revolutions is constant) it is possible to drive the synchronous motors from the same supply circuit.

The great advantage of the arrangement according to the invention consists in that it is possible to use small observation distances and lamp distances and to obtain very bright pictures. It is also possible to accommodate the mirror screw and the source of light in a common casing.

What I claim is:

1. An apparatus for the assembling of pictures in television reception, comprising a mirror screw consisting of a number of plates having mirror edges, the number of the said plates corresponding to the number of picture lines and all of them being superposed along a rotary axis and being distributed over several helical turns and means for rotating the said mirror screw in combination with a rotary screen consisting of a cylinder adapted to be rotated at a slower speed than the mirror screw to uncover only one of the said plates with mirror edges lying in the same angular position, for the purpose of direct observation of a linear source of light.

2. An apparatus as claimed in claim 1, characterized in that the said screen in the form of a cylinder surrounds the mirror screw.

3. An apparatus as claimed in claim 1 and having means for rotating the screen which are separate from the means for rotating the mirror screw.

4. An apparatus for the assembling of pictures in television reception comprising a rotatable mirror screw consisting of a number of plates having mirror edges of uniform length and uniformly spaced from the axis of rotation of the screw, the number of said plates corresponding to the number of picture lines and all of them being superposed along said rotary axis and being distributed over several helical turns, and means for rotating said mirror screw in combination with a rotary screen consisting of a cylinder adapted to be rotated at a slower speed than the mirror screw to uncover only one of said plates with mirror edges lying in the same angular position, for the purpose of direct observation of a linear source of light.

5. An apparatus as claimed in claim 4, characterized in that the length of the mirror edges approximately corresponds to the diameter of the mirror screw.

FRANZ VON OKOLICSANYI.